(12) United States Patent
Murai

(10) Patent No.: US 8,517,561 B2
(45) Date of Patent: Aug. 27, 2013

(54) STROBE DEVICE AND IMAGING DEVICE

(75) Inventor: Toshiaki Murai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/510,074

(22) PCT Filed: Nov. 16, 2010

(86) PCT No.: PCT/JP2010/006822
§ 371 (c)(1),
(2), (4) Date: May 16, 2012

(87) PCT Pub. No.: WO2011/074185
PCT Pub. Date: Jun. 23, 2011

(65) Prior Publication Data
US 2012/0257372 A1  Oct. 11, 2012

(30) Foreign Application Priority Data
Dec. 16, 2009  (JP) .................................. 2009-284702

(51) Int. Cl.
*F21V 13/04*  (2006.01)
(52) U.S. Cl.
USPC ........................................ 362/217.05; 362/16
(58) Field of Classification Search
USPC .............................. 362/3, 16, 217.02, 217.05
See application file for complete search history.

(56) References Cited

U.S. PATENT DOCUMENTS

| 5,617,163 | A | * | 4/1997 | Ohtake | ........................ 396/176 |
| 5,813,743 | A | | 9/1998 | Naka | |
| 6,467,931 | B2 | * | 10/2002 | Tenmyo | ........................ 362/223 |
| 2001/0028559 | A1 | | 10/2001 | Tenmyo | |

FOREIGN PATENT DOCUMENTS

| JP | 04-138438 A | 5/1992 |
| JP | 08-262537 A | 10/1996 |
| JP | 2001-264859 A | 9/2001 |

OTHER PUBLICATIONS

International Search Report for PCT/JP2010/006822 mailed Dec. 21, 2010.

* cited by examiner

*Primary Examiner* — David V Bruce
(74) *Attorney, Agent, or Firm* — RatnerPrestia

(57) ABSTRACT

An optical member of a strobe device includes a first incident face receiving a main beam radiated forward from a light transparent section, a pair of second incident faces receiving a complementary beam radiated forward and obliquely from the light transparent section, a pair of total reflection faces for reflecting totally and forwardly the complementary beam coming from the second incident faces, and a beam-emitting face through which the main beam and the complementary beam go outward. Each of the pair of total reflection faces is formed of a curved face, and two tangential lines to the curved faces at starting points located on a discharge tube side cross each other at an intersection point behind the center of the discharge tube and yet in front of the outer peripheral face of the glass tube.

4 Claims, 8 Drawing Sheets

STROBE DEVICE AND IMAGING DEVICE

THIS APPLICATION IS A U.S. NATIONAL PHASE APPLICATION OF PCT INTERNATIONAL APPLICATION PCT/JP2010/006822.

TECHNICAL FIELD

The present invention relates to a strobe device formed of a discharge tube and an optical member. The discharge tube includes a glass bulb having a reflective film formed on an outer face thereof and a light transparent section formed on a front face, where no reflective film is formed, of the glass bulb. The optical member radiates light supplied through the light transparent section of the discharge tube to a photographic object. The present invention also relates to an imaging device equipped with the same strobe device.

BACKGROUND ART

A conventional strobe device to be used for shooting a still picture or a moving picture includes a reflective lampshade (reflector) for reflecting light, radiated from a discharge tube, toward an object. The light radiated from the center of the discharge tube (glass bulb) travels in every direction (radiated from the entire circular direction of the discharge tube), so that an opening of the reflective lampshade should be large enough for this light to be condensed within an irradiation range. This large opening has prevented the strobe device from being downsized.

When the light radiated from the discharge tube is reflected on the reflective lampshade, the light radiated oppositely to the object (existing on the front side) repeats transmissions through the glass bulb, of which refractive index is greater than that of the air, and reflections on the reflective lampshade. An amount of light thus decreases in every transmission and reflection.

An optical member is provided to the strobe device in addition to the reflective lampshade for improving an efficiency of light condensation. However, this strobe device has a possibility that the amount of light further decreases because the light having undergone the reflections on the reflective lampshade is condensed with the optical member having a different refractive index (refer to, e.g. Patent Literature 1).

The inventors of the present invention address the problem discussed above and propose a strobe device that can be downsized and prevent an amount of light from decreasing caused by light radiation outside the irradiation range. This strobe device includes reflective film formed on outer peripheral surface of a glass bulb and a light transparent section, where no reflective film is formed, formed on a front side of the outer peripheral surface of the glass bulb.

On top of that, the inventors have found out that the positional relation described below is an important factor for increasing an efficiency of light emission by collecting the dispersing light radiated from the light transparent section of the foregoing discharge tube.

The positional relation exists between the light transparent section, a reflective curve inside the optical member, and the center of the discharge tube (center axis of the glass bulb).

CITATION LIST

Patent Literature

PTL 1 Unexamined Japanese Patent Application Publication No. H08-262537

SUMMARY OF THE INVENTION

A strobe device of the present invention comprises the following structural elements:
 a discharge tube including:
a cylindrical glass bulb;
 a reflective film formed on outer peripheral face of the glass bulb; and
 a light transparent section shaped in an area where no reflective film is formed on the front side of the outer peripheral face; and
 an optical member disposed in front of the light transparent section.

The optical member comprises the following structural elements:
 a first incident face confronting the transparent section of the discharge tube in front of the transparent section for receiving a main beam radiated forward from the light transparent section;
 a pair of second incident faces extending from the discharge tube toward the first incident face with a space provided therebetween in a direction orthogonal to a center axis of the discharge tube for receiving a complementary beam radiated obliquely forward from the light transparent section of the discharge tube;
 a pair of total reflection faces extending forward on the outside of the second incident faces with a space provided therebetween in the direction orthogonal to the center axis of the discharge tube for reflecting totally and forwardly the complementary beam coming from the second incident faces; and
 an beam-emitting face formed in front of the first incident face for projecting the main beam and the complementary beam outward.

Each of the pair of total reflection faces is formed of a curved face such that the space between the curved faces expands toward the front side from the discharge tube side gradually. Two tangential lines to the curved face at a starting points located on the discharge tube side cross each other at an intersection point behind the center of the discharge tube and yet in front of the outer peripheral face of the glass tube.

The strobe device discussed above allows the main beam radiated forward from the discharge tube at the light transparent section passes through the first incident face and the beam-emitting face before the main beam goes forward and outside. In other words, the main beam transmitted through the light transparent section has an angle of zero or a narrow angle with respect to the optical axis of the strobe device, so that the main beam radiates the irradiation range in front without spreading widely. On the other hand, the complementary beam radiated forward obliquely from the discharge tube at the light transparent section has a wider angle than the main beam with respect to the optical axis of the strobe device, so that the complementary beam does not enter the first incident face but enters the second incident faces disposed at both sides of the first incident face. The complementary beam then passes through the second incident faces and reaches to the total reflection face.

Due to the refraction at the enter into the second incident face, the complementary beam has a wider angle with respect to the optical axis of the strobe device than the angle when it has been radiated from the discharge tube at the light transparent section. The complementary beam reaches the total reflection face with this wider angle, and it reflects on the total reflection face and changes its direction toward the optical axis of the strobe device. Since each of the total reflection faces, in particular, of the strobe device discussed above is formed of a curved face, and each curved face extends forward from the discharge tube with the space therebetween expanding gradually, and two tangential lines to the curved face at a starting point, located on the discharge tube side cross each other at a point behind the center of the discharge tube and yet in front of the outer peripheral face of the glass tube, the complementary beam having passed through the second incident face and reflected on the total reflected face rises like a straight line (closer to be parallel with the optical axis of the strobe device) as the complementary beam reflects on the total reflected face closer to the discharge tube, i.e. the starting point of the curved face.

The structure discussed above allows the light from the discharge tube not to travel artlessly outside the irradiation range but to have both the main beam and the complementary beam fall efficiently within the irradiation range in front.

DESCRIPTION OF EMBODIMENTS

A strobe device in accordance with an exemplary embodiment of the present invention is demonstrated hereinafter with reference to the accompanying drawings.

Figure 1:
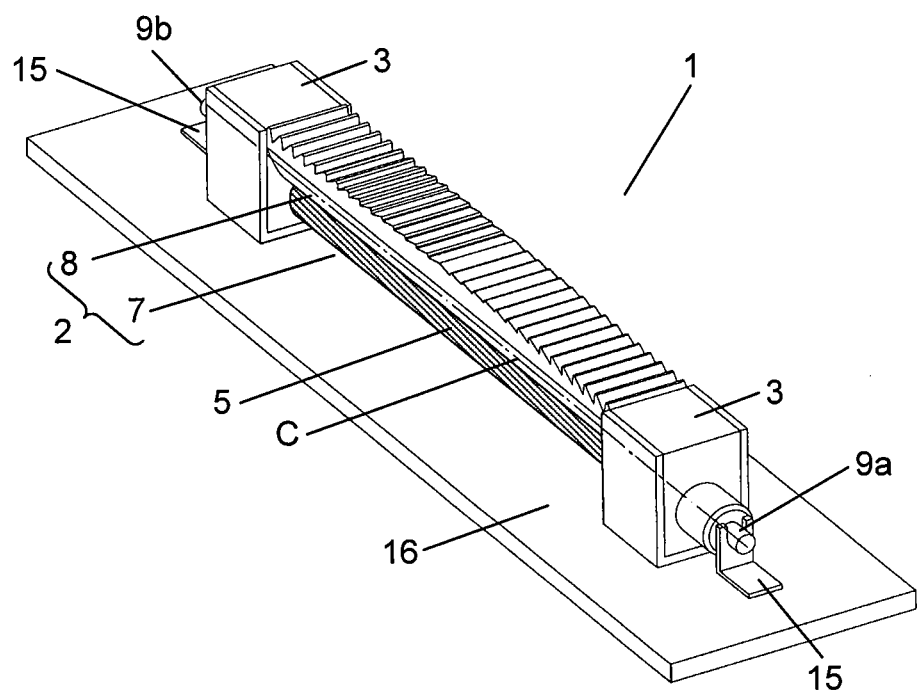
FIG. 1 is a schematic perspective view of a strobe device in accordance with an exemplary embodiment of the present invention.

The strobe device in accordance with the embodiment is used in an imaging device (not shown), e.g. digital camera, analog camera, and a camcorder. The strobe device includes, as shown in FIG. 1, light emitting section 2 for emitting light to be radiated to an object, and holder 3 for holding light emitting section 2.

Figure 2:
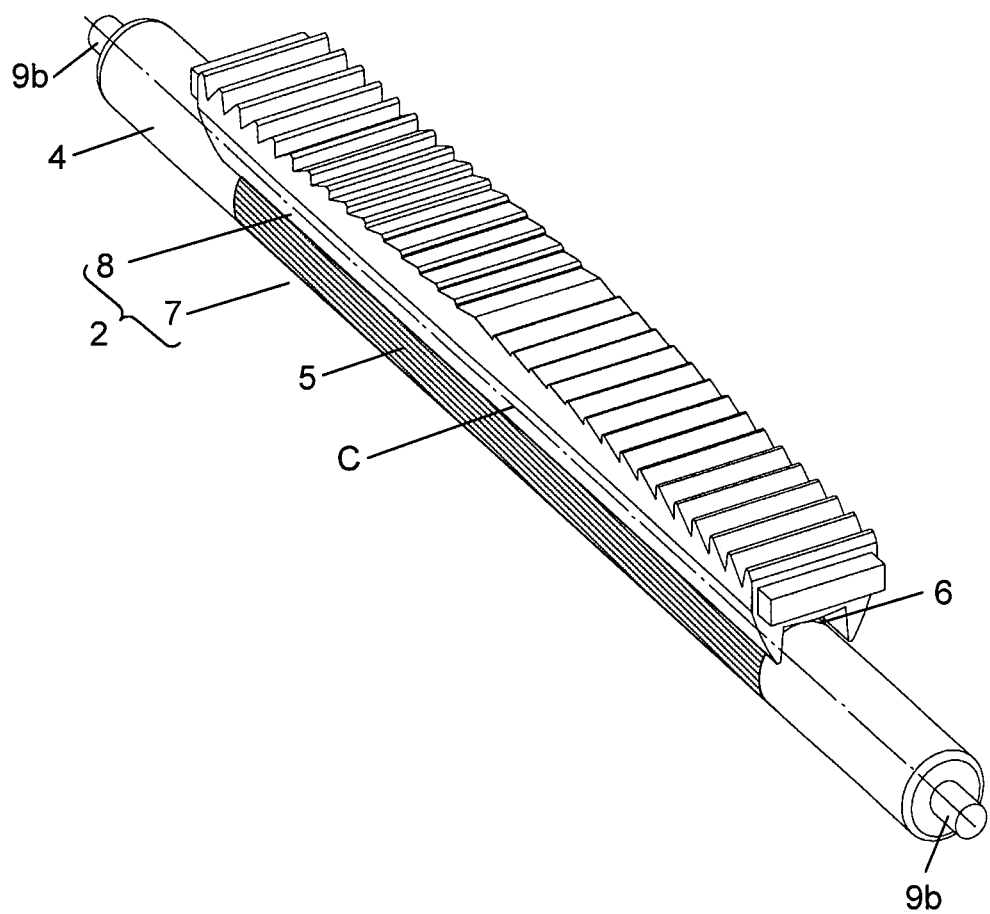
FIG. 2 is a schematic perspective view of a light emitting section of a strobe device in accordance with an exemplary embodiment of the present invention.
Figure 3:
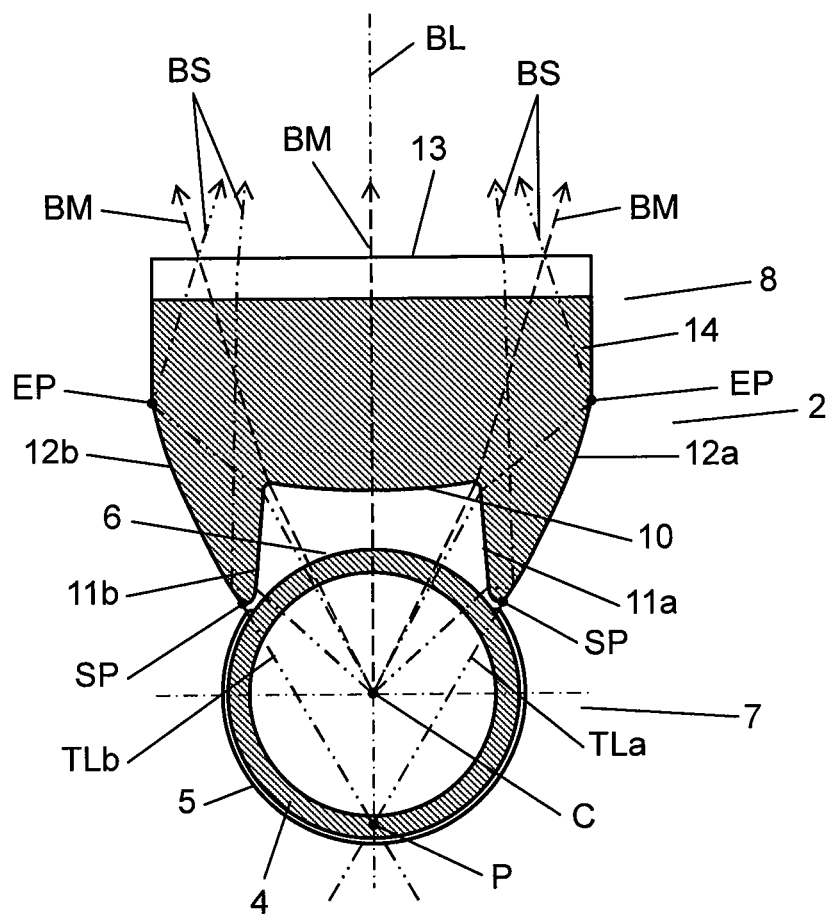
FIG. 3 is a schematic sectional view of a light emitting section of a strobe device in accordance with an embodiment of the present invention.

As shown in FIG. 2 and FIG. 3, light emitting section 2 includes discharge tube 7 and optical member 8 disposed in front of light transparent section 6. Discharge tube 7 is formed of reflective film 5 disposed on an outer peripheral face of cylindrical glass bulb 4 and light transparent section 6 disposed on the outer peripheral face of glass bulb 4 at the front where no reflective film 5 is formed.

Discharge tube 7 is a flash discharge tube, and as shown in FIG. 2, it is formed of cylindrical glass bulb 4 with electrode terminals 9a, 9b sealed therein at both the ends thereof. Discharge tube 7 in accordance with this embodiment includes reflective film 5 and light transparent section 6. Reflective film 5 is formed corresponding to a light emission area of discharge tube 7 and extending along center axis C as well as the peripheral direction of glass bulb 4.

To be more specific, reflective film 5 is formed by metal deposition, and as shown in FIG. 3, it is formed along the peripheral direction of glass bulb 4 within a range from 240-270° with respect to center axis C of glass bulb 4. As a result, discharge tube 7 in accordance with this embodiment has light transparent section 6, i.e. the section where no reflective film 5 is formed, on the outer peripheral face of glass bulb 4. This light transparent section 6 is formed within a range from 90-120° along the peripheral direction of glass bulb 4 with respect to center axis C of glass bulb 4. In other words, light transparent section 6 forms a rectangle of which long side extends along center axis C of glass bulb 4.

Optical member 8 is formed to confront the whole area of light transparent section 6 of discharge tube 7, so that optical member 8 has a long side corresponding to the long side, running along center axis C, of glass bulb 4. Optical member 8 receives a light from discharge tube 7 and reflects the light inside thereof, and then projects the light outside. Optical member 8 is made of light-transparent material, e.g. transparent glass or resin, and in this embodiment, it is molded of transparent acrylic resin in order to achieve both of optical performance and easy-to-mold.

Optical member 8 in accordance with this embodiment includes first incident face 10, a pair of second incident faces 11a and 11b, a pair of total reflection faces 12a and 12b, and beam-emitting face 13. First incident face 10 confronts, in front of discharge tube 7, light transparent section 6 of discharge tube 7, and receives main beam BM radiated forward from light transparent section 6. The pair of second incident faces 11a and 11b extend from discharge tube 7 side toward first incident face 10 with a space therebetween in a direction orthogonal to center axis C of discharge tube 7 (glass bulb 4), and receive complementary beam radiated forward and obliquely from light transparent section 6 of discharge tube 7. The pair of total reflection faces 12a and 12b extend forward on the of outside second incident faces 11a and 11b with a space therebetween in the direction orthogonal to center axis C of discharge tube 7. Total reflection faces 12a and 12b totally and forwardly reflect complementary beam BS coming from second incident faces 11a and 11b. Beam-emitting face 13 is formed in front of first incident face 10, and both main beam BM and complementary beam BS go outside through beam-emitting face 13.

First incident face 10 is convex with respect to discharge tube 7, in other words, it is concave with respect to beam-emitting face 13, and it curves along the direction orthogonal to center axis C of discharge tube 7 from a first edge of first incident face 10 to a second edge thereof. A curvature of first incident face 10 is determined in response to an irradiation range of the light targeted at an object.

Strobe device 1 in accordance with this embodiment sets optical axis BL on a virtual line running at center axis C of discharge tube 7 and at the center of light transparent section 6 along the peripheral direction of glass bulb 4. First incident face 10 is thus formed such that optical axis BL runs at the center of first incident face 10 along the direction orthogonal to center axis C of discharge tube 7 (glass bulb 4).

Each of the pair of second incident faces 11a and 11b has a starting point at discharge tube 7 side and its end point is connected to the edge of first incident face 10. To be more specific, each of second incident faces 11a and 11b has the starting point near either of both the edges (boundary to reflective film 5) of light transparent section 6 along the peripheral direction of glass bulb 4, and each of second incident faces 11a and 11b extends forward from the starting point to the end point connected to the edge (either one of both the edges located along a direction orthogonal to center axis C of discharge tube 7) of first incident face 10.

The pair of second incident faces 11a and 11b are placed symmetrically with respect to optical axis BL. In this embodiment, each of second incident faces 11a and 11b slants from the starting point toward optical axis BL. In other words, each of second incident faces 11a and 11b is placed such that the starting point is located outer (farther away from optical axis BL) than the end point with respect to the direction orthogonal to center axis C of discharge tube 7. This structure allows optical member 8 to have a groove-like recess defined by first incident face 10 and the pair of second incident faces 11a and 11b.

Each of total reflection faces 12a and 12b forms a curved face extending forward from discharge tube 7 side with a space therebetween expanding. Two tangential lines TLa and TLb to curved faces 12a and 12b at the starting points located on discharge tube 7 side cross each other at an intersection point P behind the center C of discharge tube 7 and yet in front of the outer peripheral face of glass bulb 4.

To be more specific, each of total reflection faces 12a and 12b is convex outward, and tangential lines TLa and TLb to total reflection faces 12a and 12b extend from their starting points SP located on discharge tube 7 side, these two tangential lines cross each other at an intersection point P behind (opposite to light transparent section 6 located on the front side) center axis C of glass bulb and yet in front of the outer peripheral face of glass bulb 4.

The pair of total reflection faces 12a and 12b is formed such that complementary beam BS reflected on first total reflection face 12a at end point EP side travels in parallel with or generally in parallel with main beam BM passing near the edge, located at a second total reflection face 12b side, of first incident face 10.

Beam-emitting face 13 is located at the forefront of strobe device 1 (light emitting section 2), and confronts first incident face 10. Optical member 8 provides beam-emitting face 13 with Fresnel groove in order to improve the optical characteristics. Considering an integrated state (or a mounted state) of strobe device 1 to an imaging device, beam-emitting face 13 is formed between respective end points EPs of the pair of total reflection faces 12a and 12b or in front of end points EPs.

In optical member 8 in accordance with this embodiment, beam-emitting face 13 is formed in front of end points EPs of total reflection faces 12a and 12b so that margin 14 can be provided between beam-emitting face 13 and end points EPs of total reflection faces 12a and 12b. This margin 14 is reserved for an opening of a frame (not shown) of the imaging device in the case of mounting strobe device 1 to the imaging device. Optical member 8 as a whole is unitarily molded, so that margin 14 can be also molded together with another section unitarily, i.e. a solid section existing between the pair of total reflection faces 12a and 12b. Between margin 14 and this another section, there is no faces that reflect the light, so that the presence of margin 14 cannot change the paths of lights coming from the another sections.

Returning to FIG. 1, holder 3 holds discharge tube 7 and also holds optical member 8 being brought into contact with discharge tube 7. Holder 3 is fixed to connecting metal brackets 15 that are electrically connected with electrode terminals 9a and 9b of discharge tube 7. Holder 3 is rigidly mounted onto substrate 16 via connecting metal brackets 15 that are fixed to substrate 16.

Strobe device 1 in accordance with the embodiment is demonstrated hereinafter. As shown in FIG. 3, when discharge tube 7 emits light, main beam BM transmitting through light transparent section 6 goes out forward straightly through first incident face 10 and beam-emitting face 13. To be more specific, main beam BM transmitting through light transparent section 6 has angle 0 (zero) or a narrow angle with respect to optical axis BL of strobe device 1, so that main beam BM can radiate to the front (irradiation range) without spreading widely after the transmission through a first light transparent section and beam-emitting face 13 both placed ahead of light transparent section 6.

On the other hand, complementary beam BS radiated forward and obliquely from light transparent section 6 has a wider angle with respect to optical axis BL of strobe device 1 than main beam BM, so that it does not enter first incident face 10 but enters second incident faces 11a and 11b disposed on both sides of first incident face 10. Complementary beam BS enters each one of second incident faces 11a and 11b then reaches onto total reflection faces 12a and 12b.

Complementary beam BS is refracted at an incident into second incident faces 11a and 11b, and thus has a wider angle with respect to optical axis BL of strobe device 1 than the angle of complementary beam BS radiated from light transparent section 6 of discharge tube 7, and then reaches to total reflection faces 12a and 12b. Complementary beam BS then reflects on total reflection faces 12a and 12b to change its direction toward optical axis BL of strobe device 1.

Each of total reflection faces 12a and 12b of strobe device 1 in accordance with this embodiment forms a curved face extending forward from discharge tube 7 side with a space between total reflection faces 12a and 12b expanding, and two tangential lines TLa and TLb to the two curved faces at the starting points located on discharge tube 7 side cross each other behind the center of discharge tube 7 and yet in front of the peripheral face of glass bulb 4. This structure allows complementary beam BS reflected on total reflection faces 12a and 12b to rise more straightly as the reflecting points shift closer to discharge tube 7 (nearer to starting points SP). In other words, the reflected beam travels closely in parallel with optical axis BL of strobe device 1.

Strobe device 1 in accordance with this embodiment thus allows the light supplied from discharge tube 7 not to go artlessly outside the irradiation area but allows the main beam BM and complementary beam BS to radiate efficiently into the irradiation range in front.

Total reflection faces 12a and 12b are formed such that complementary beam BS reflected on end point EP side can travel in parallel with main beam BM passing near the edge of first incident face 10 on the counterpart total reflection face side. As a result, complementary beam BS goes into the region where main beam BM exists. This structure allows the entire light (including main beam BM and complementary beam BS) radiated from discharge tube 7 to radiate efficiently into the irradiation range.

Strobe device 1 can advantageously irradiates the irradiation range efficiently with the light radiated from discharge tube 7. Total reflection faces 12a and 12b of strobe device 1 can minimize the space therebetween due to the structure discussed above, so that light emitting section 2 as a whole can be downsized.

The imaging device with built-in strobe device 1 in accordance with the embodiment allows the light radiated from discharge tube 7 to radiate efficiently into the irradiation range, so that a fine picture or a fine film can be advantageously taken.

Embodiment 1

Figure 4A:
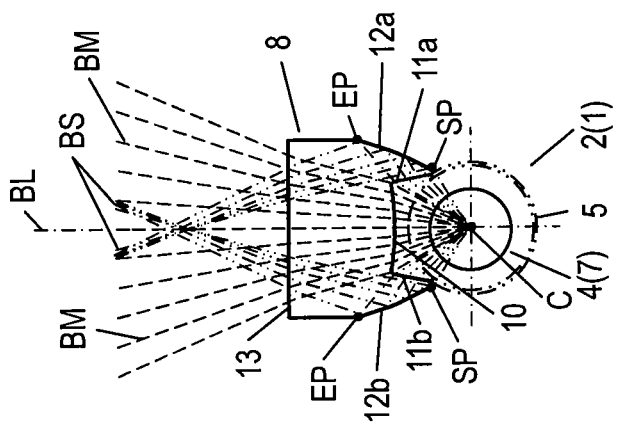
FIG. 4A is a schematic sectional view of a light emitting section in accordance with a first embodiment of the present invention for illustrating a difference in light path between this section and a light emitting section of a comparison sample.

The inventors have acknowledged that the strobe device of the present invention performs well. To be more specific, as shown in FIG. 4A, strobe device 1 in accordance with this first embodiment is the one discussed in the previous exemplary embodiment. Discharge tube 7 employs a flash-discharge tube that is formed of glass bulb 4 having an outer diameter of 1.3 mm and an inner diameter of 0.85 mm. Reflective film 5 is formed on glass bulb 4 within a range of 250° with respect to center axis C of glass bulb 4, while light transparent section 6 is formed within a range of 110° with respect to center axis C. Optical member 8 is made of acrylic resin having refractive index of ca. 1.49 with respect to "d" line. A radiation angle of strobe device 1 in accordance with the first embodiment is set at 27° for each side with respect to optical axis BL (total range is 54°, which corresponds to 28 mm for 35 mm type lens).

A curvature radius of first incident face 10 is thus set at 3 mm in order to allow first incident face 10 to control the light entering, with an angle of ca. 30° for each side with respect to optical axis BL, into first incident face 10. Second incident faces 11a and 11b are set to slant angle at 3° with respect to optical axis BL because it is necessary to consider the refractive index of optical member 8 in order to set a radiation angle at 54°. As discussed previously, each of the pair of total reflection faces 12a and 12b forms a curved face extending forward from discharge tube 7 side with a space between total reflection faces 12a and 12b gradually expanding, and the two tangential lines (not shown in FIG. 4) to the curved faces extend from starting points SP located on discharge tube 7 side cross each other behind the center of discharge tube 7 and yet in front of the outer peripheral face of glass bulb 4.

Figure 4B:
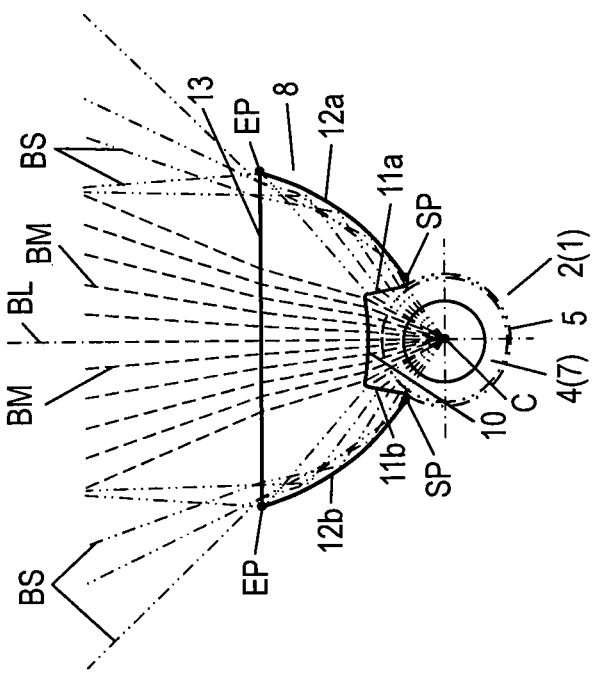
FIG. 4B is a schematic sectional view of a light emitting section of a first comparison sample for illustrating a difference in light path between this section and a light emitting section in accordance with the first embodiment.

As shown in FIG. 4B, strobe device 1 of a first comparison sample to be compared with the first embodiment employs the same discharge tube 7 as that of the first embodiment, and first incident face 10, second incident faces 11a, 11b are set in the same conditions as those of the first embodiment. Each of a pair of total reflection faces 12a and 12b forms a curved face such that the space between total reflection face 12a and total reflection face 12b expands toward the front side from discharge tube 7 side, and two tangential lines (not shown) to each of the curved faces at starting point SP located on discharge tube 7 side cross each other in front of center C of discharge tube 7.

Figure 4C:
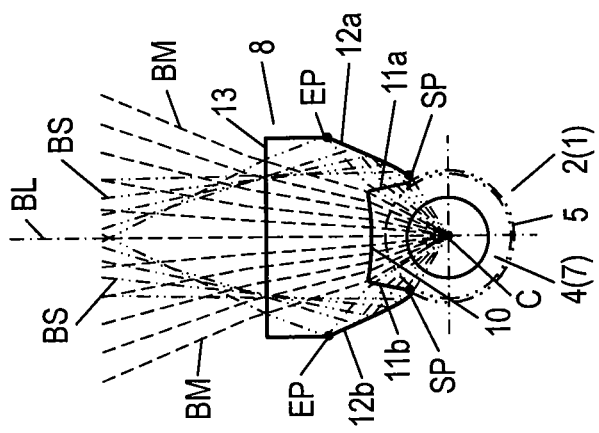
FIG. 4C is a schematic sectional view of a light emitting section of a second comparison sample for illustrating a difference in light path between this section and a light emitting section in accordance with the first embodiment.

Strobe device 1 of comparison sample 2 to be compared with the first embodiment, as shown in FIG. 4C, employs the same discharge tube 7 as that of the first embodiment, and first incident face 10, second incident faces 11a, 11b are set in the same conditions as those of the first embodiment. Each of a pair of total reflection faces 12a and 12b forms a curved face such that the space between total reflection face 12a and total reflection face 12b expands toward the front side from discharge tube 7, and two tangential lines (not shown) to each of the curved faces at starting points SP located on discharge tube 7 side cross each other behind the outer peripheral face of glass bulb 4.

Respective strobe devices 1 of the first embodiment, the first comparison sample, and the second comparison sample emit light under the same condition. Strobe device 1 in accordance with the first embodiment performs as follows: As FIG. 4A illustrates, main beam BM (indicated with broken lines in FIG. 4A) entering first incident face 10 has a rather narrow angle with respect to optical axis BL due to the refraction index of optical member 8, and then main beam BM travels through optical member 8. When main beam BM goes out from beam-emitting face 13, it has a rather wide angle with respect to optical axis BL due to a different refraction index, and goes outside, namely, falls on the irradiation range. At this time, complementary beam BS entering a vicinity of the edge of first incident face 10 has an angle of ca. 27° with respect to optical axis BL, so that a radiation angle of strobe device 1 is set at 54°.

Since total reflection faces 12a and 12b form curves convex to the outside, the tangential lines to total reflection faces 12a and 12b extend in different directions at any point between starting point SP and end point EP. Total reflection faces 12a and 12b are formed such that the tangential lines to total reflection faces 12a and 12b at starting points SP located on discharge tube 7 side cross each other behind center axis C of discharge tube 7 and yet in front of the outer peripheral face of glass bulb 4. As a result, total reflection faces 12a and 12b near starting points SP have a curvature/shape that allows the complementary beam going out from second incident faces 11a and 11b to reflect generally in parallel with the optical axis.

The structure discussed above allows the complementary beam BS (indicated with alternate long and two short dashes line) reflected on the points near starting points SP of total reflection faces 12a and 12b to travel generally in parallel with optical axis BL, so that complementary beam BS falls on the center part of the irradiation range. Complementary beam BS reflected on any point (reflection face) between starting point SP and end point EP of total reflection faces 12a and 12b reflects crossing optical axis BL, and complementary beam BS reflecting on a point nearer to end point EP travels closer in parallel with main beam BM that passes a vicinity of the edge of first incident face 10 located at the counterpart total reflection face 12a or 12b.

This mechanism allows strobe device 1 in accordance with the first embodiment to collect main beam BM and complementary beam BS within the irradiation range, and on top of that, this strobe device 1 can radiate a wide area in the irradiation range with a great light volume.

Figure 5A:
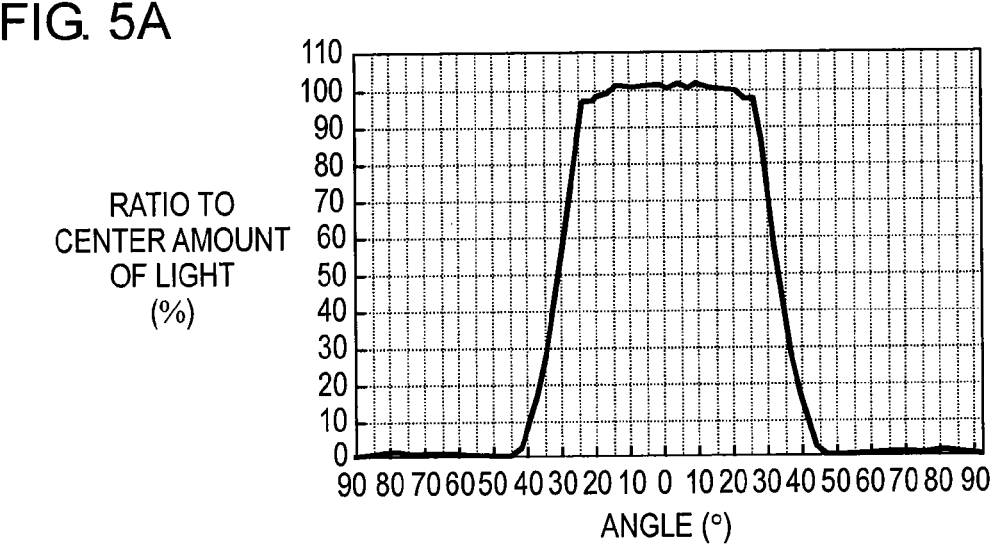
FIG. 5A is a graph of a light distribution of the light emitting section in accordance with the first embodiment for illustrating a difference in light distribution between this section and the light emitting section of a comparison sample.

It is thus acknowledged that strobe device 1 in accordance with the first embodiment can achieve substantially uniform light distribution. To be more specific, as shown in FIG. 5A, assume that the light volume at the center part (the part included within 10° on each side of optical axis BL) of the irradiation range is 100%, a light volume at a peripheral part (the part included within 27° on each side of optical axis BL) can be lowered from that of at the center part as little as 15%, i.e. only approx. 0.3 EV.

On the other hand, total reflection faces 12a and 12b of strobe device 1 of the first comparison sample are formed such that two tangential lines, as shown in FIG. 4B, at starting points SP located on discharge tube 7 side cross each other in front of center C of discharge tube 7. The tangential line thus has a wider angle at the starting point SP than at the end point EP with respect to optical axis BL. In other words, total reflection faces 12a and 12b are curved with a wider angle on the starting point SP side with respect to optical axis BL, so that if the light going out from discharge tube 7 and reflecting on total reflection faces 12a and 12b must travel generally in parallel with optical axis BL, total reflection faces 12a and 12b need a greater curvature. On top of that, the curve of total reflection faces 12a and 12b around the starting point SP must be set such that the space between total reflection face 12a and total reflection face 12b falls within a radiation angle. As a result, strobe device 1 of the third comparison sample needs total reflection faces 12a and 12b having a greater curvature than that of strobe device 1 in accordance with the first embodiment, and end points EP of total reflection faces 12a and 12b of this comparison sample are located farther forward. Although margin 14 reserved for mounting strobe device 1 of the third comparison sample to an imaging device is omitted from strobe device 1 of the first comparison sample, (i.e. beam-emitting face 13 extends between end points EP of total reflection faces 12a and 12b), optical member 8 as a whole becomes bulky.

In strobe device 1 of the first comparison sample, complementary beam BS enters total reflection faces 12a and 12b at an excessively wide incident angle, so that complementary beam BS reflects to the outside of optical member 8. Complementary beam BS reflected at around starting point SP of total reflection faces 12a and 12b thus reflects again on total reflection faces 12a and 12b at end point EP side. Although complementary beam BS resultantly falls on the irradiation range, its light volume decreases due to multiple reflections on total reflection faces 12a and 12b. In strobe device 1 of the first comparison sample, multiple reflections between starting point SP and end point EP on total reflection faces 12a and 12b reduce the light volume of complementary beam BS.

In strobe device 1 of the first comparison sample, the repeated reflections on total reflection faces 12a and 12b make many of complementary beams BS hard to enter the light path through which main beam BM travels, and complementary beams BS reflected at the vicinity of end point EP of total reflection faces 12a and 12b are radiated toward the center, i.e. toward optical axis BL. As a result, although complementary beams BS reflected at the vicinity of end point EP gather at the center of the irradiation range, many other complementary beams BS fall outside the irradiation range.

Figure 5B:
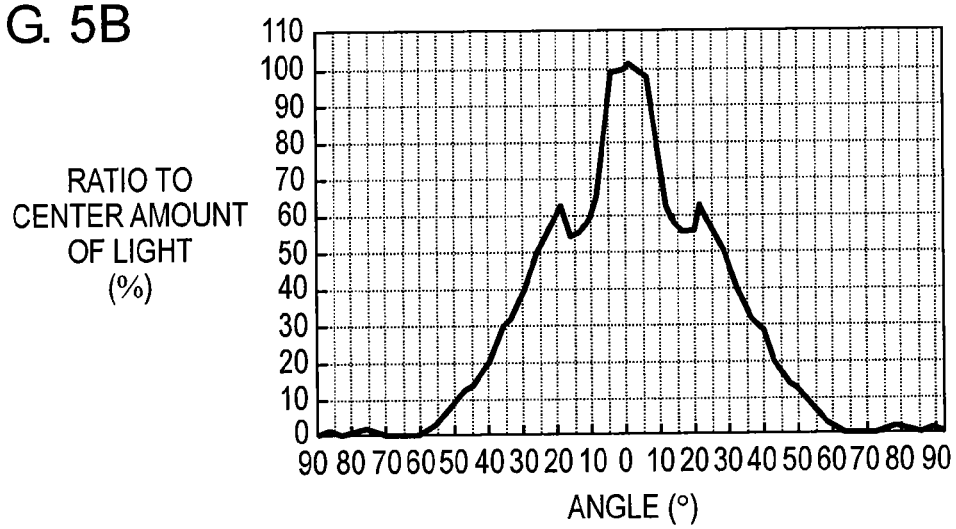
FIG. 5B is a graph of a light distribution of a light emitting section of the first comparison sample for illustrating a difference in light distribution between this section and the light emitting section in accordance with the first embodiment of the present invention.

As shown in FIG. 5B, in strobe device 1 of the first comparison sample, only the center part of the irradiation range, on which main beam BM falls, receives a greater light volume, because complementary beams BS reflected around end point EP of total reflection faces 12a and 12b gather at this center part. It is thus acknowledged that strobe device 1 of the first comparison sample cannot distribute the light uniformly.

As shown in FIG. 4C, in strobe device 1 of the second comparison sample, each of total reflection faces 12a and 12b is formed such that the two tangential lines extending from starting point SP, located on discharge tube 7 side, cross each other behind the outer peripheral face of glass bulb 4. The tangential lines have a narrow angle with respect to optical axis BL, so that total reflection faces 12a and 12b rise at the vicinity of starting points SP. As a result, the space between the pair of total reflection faces 12a and 12b becomes so narrow that complementary beam BS outgoing from discharge tube 7 enters total reflection faces 12a and 12b at an narrower incident angle than necessary.

In strobe device 1 of the second comparison sample, although complementary beams BS, reflected on total reflection faces 12a and 12b, travel through the light path of main beam BM, they incline largely toward optical axis BL. As a result, strobe device 1 of the second comparison sample has a smaller amount of light reflected generally in parallel with optical axis BL than that of strobe device 1 in accordance with the first embodiment, and complementary beam BS going out from beam-emitting face 13 crosses optical axis BL (i.e. at a place nearer to beam-emitting face 13) before it reaches the object.

Figure 5C:
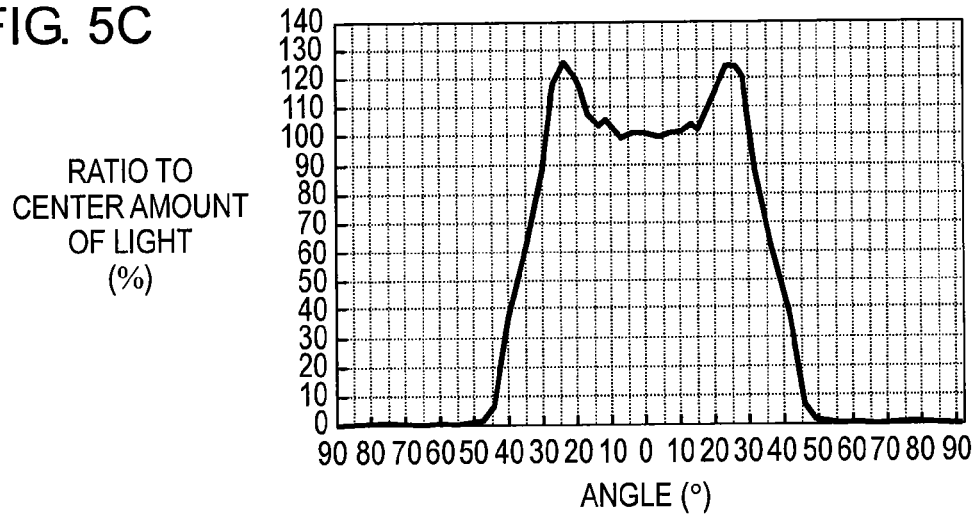
FIG. 5C is a graph of a light distribution of a light emitting section of the second comparison sample for illustrating a difference in light distribution between this section and the light emitting section in accordance with the first embodiment of the present invention.

In strobe device 1 of the second comparison sample, complementary beams BS thus gather on periphery of the center part of the irradiation range on which main beam BM falls, and as shown in FIG. 5C, the center part of the irradiation range receives a smaller light volume. It is thus acknowledged that this strobe device 1 cannot distribute the light uniformly.

Strobe device 1 in accordance with the first embodiment is proved that it performs more excellently than strobe devices 1 of the first and the second comparison samples.

Embodiment 2

Figure 6A:
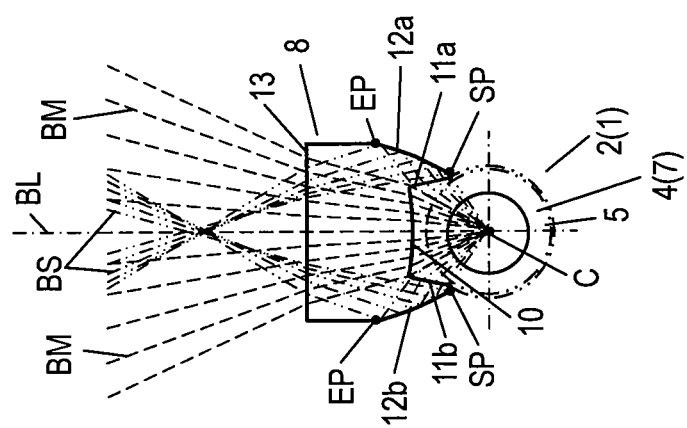
FIG. 6A is a schematic sectional view of a light emitting section in accordance with a second embodiment of the present invention for illustrating a difference in light path between this section and a light emitting section of a comparison sample.

The inventors also have acknowledged the performance of strobe device 1 having a wider radiation angle. To be more specific, strobe device 1 in accordance with the second embodiment of the present invention, as shown in FIG. 6C, has been demonstrated in the exemplary embodiment previously discussed. Discharge tube 7 employs a flash-discharge tube that is formed of glass bulb 4 having an outer diameter of 1.3 mm and an inner diameter of 0.85 mm. Reflective film 5 is formed on glass bulb 4 within a range of 250° with respect to center axis C of glass bulb 4, while light transparent section 6 is formed within a range of 110° with respect to center axis C. Optical member 8 is made of acrylic resin having refractive index of ca. 1.49 with respect to "d" line. A radiation angle of strobe device 1 in accordance with the second embodiment is set at 30° for each side with respect to optical axis BL (total range is 60°, which corresponds to 24 mm for 35 mm type lens).

A curvature radius of first incident face 10 is thus set at 5 mm in order to allow first incident face 10 to control the light entering, with an angle of ca. 30° for each side with respect to optical axis BL, into first incident face 10. Second incident faces 11a and 11b are set to slant angle at 3° with respect to optical axis BL because it is necessary to consider the refractive index of optical member 8 in order to set a radiation angle at 60°.

As discussed previously, each of the pair of total reflection faces 12a and 12b forms a curved face such that the space between total reflection faces 12a and 12b expands toward the front side from discharge tube 7 side, and the two tangential lines (not shown) to the curved faces extend from starting points SP located on discharge tube 7 side and cross each other behind the center of discharge tube 7 and yet in front of the outer peripheral face of glass bulb 4.

Figure 6B:
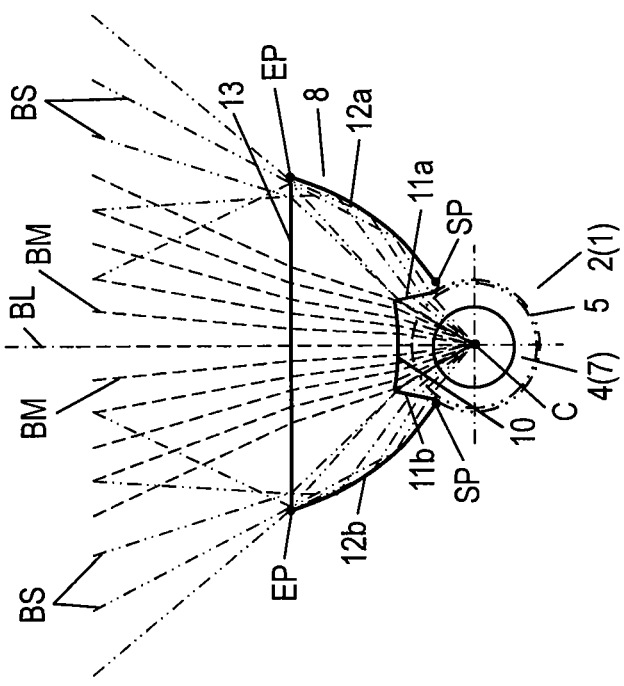
FIG. 6B is a schematic sectional view of a light emitting section of a third comparison sample for illustrating a difference in light path between this section and a light emitting section in accordance with the second embodiment.
Figure 6C:
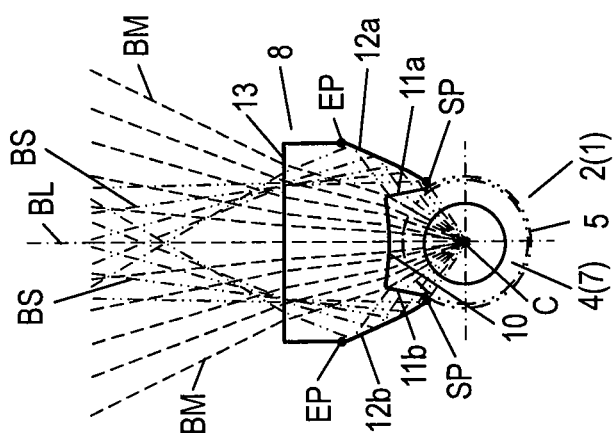
FIG. 6C is a schematic sectional view of a light emitting section of a fourth comparison sample for illustrating a difference in light path between this section and a light emitting section in accordance with the second embodiment.

As shown in FIG. 6B, strobe device 1 of a third comparison sample to be compared with the second embodiment employs the same discharge tube 7 as that of the second embodiment, and first incident face 10, second incident faces 11a, 11b are set in the same conditions as those of the second embodiment. Each of a pair of total reflection faces 12a and 12b forms a curved face such that the space between total reflection faces 12a and 12b expands toward the front side from discharge tube 7 side, and two tangential lines (not shown) to each of the curved faces at starting points SP, located on discharge tube 7 side, cross each other in front of center C of discharge tube 7.

Strobe device 1 of comparison sample 4 to be compared with the second embodiment, as shown in FIG. 6C, employs the same discharge tube 7 as that of the second embodiment, and first incident face 10, second incident faces 11a, 11b are set in the same conditions as those of the second embodiment. Each of a pair of total reflection faces 12a and 12b forms a curved face such that the space between total reflection faces 12a and 12b expands toward the front side from discharge tube 7, and two tangential lines (not shown) to each of the curved faces at starting points SP, located on discharge tube 7 side, cross each other behind the outer peripheral face of glass bulb 4.

Respective strobe devices 1 of the second embodiment, the third comparison sample, and the fourth comparison sample emit light under the same condition. Strobe device 1 in accordance with the second embodiment performs as follows: As FIG. 6A illustrates, main beam BM (indicated with broken lines in FIG. 6A) entering first incident face 10 has a rather narrow angle with respect to optical axis BL due to the refraction index of optical member 8, and then main beam BM travels through optical member 8. When main beam BM goes out from beam-emitting face 13, it has a rather wide angle with respect to optical axis BL due to a different refraction index, and goes outside, namely, falls on the irradiation range. At this time, complementary beam BS entering a vicinity of the edge of first incident face 10 has an angle of ca. 30° with respect to optical axis BL, so that a radiation angle of strobe device 1 is set at 60°.

Since total reflection faces 12a and 12b form curves convex to the outside, the tangential lines to total reflection faces 12a and 12b extend in different directions at any point between starting point SP and end point EP. Total reflection faces 12a and 12b are formed such that the tangential lines to total reflection faces 12a and 12b at starting points SP, located on discharge tube 7 side, cross each other behind center axis C of discharge tube 7 and yet in front of the outer peripheral face of glass bulb 4. As a result, total reflection faces 12a and 12b near starting points SP have a curvature/shape that allows the complementary beam going out from second incident faces 11a and 11b to reflect generally in parallel with the optical axis.

The structure discussed above allows the complementary beam BS (indicated with alternate long and two short dashes line) reflected on the points near starting points SP of total reflection faces 12a and 12b to travel generally in parallel with optical axis BL, so that complementary beam BS falls on the center part of the irradiation range. Complementary beam BS reflected on any point (on reflection face) between starting point SP and end point EP of total reflection faces 12a and 12b reflects crossing optical axis BL, and complementary beam BS reflecting on a point nearer to end point EP travels closer in parallel with or generally in parallel with main beam BM that passes a vicinity of the edge of first incident face 10 located at the counterpart total reflection face 12a or 12b.

This mechanism allows strobe device 1 in accordance with the second embodiment to collect main beam BM and complementary beam BS within the irradiation range, and on top of that, this strobe device 1 can radiate a wide area in the irradiation range with a great light volume.

Figure 7A:
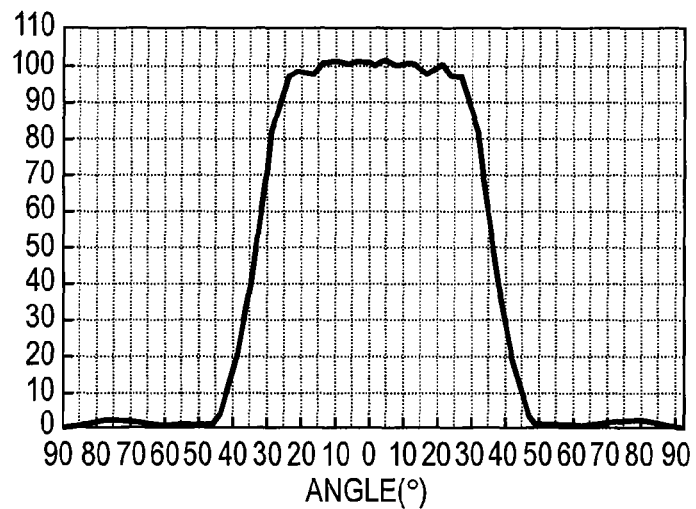
FIG. 7A is a graph of a light distribution of the light emitting section in accordance with the second embodiment for illustrating a difference in light distribution between this section and the light emitting section of a comparison sample.

It is thus acknowledged that strobe device 1 in accordance with the second embodiment can achieve substantially uniform light distribution. To be more specific, as shown in FIG. 7A, assume that the light volume at the center part (the part included within 10° on each side of optical axis BL) of the irradiation range is 100%, a light volume at a peripheral part (the part included within 30° on each side of optical axis BL) can be lowered from that of at the center part as little as 20%, i.e. only approx. −0.3 EV.

On the other hand, total reflection faces 12a and 12b of strobe device 1 of the third comparison sample are formed such that two tangential lines, as shown in FIG. 6B, at starting points SP located on discharge tube 7 side cross each other at an intersection point P in front of center C of discharge tube 7. The tangential line thus has a wider angle with respect to optical axis BL. In other words, total reflection faces 12a and 12b are curved with a wider angle on the starting point SP side with respect to optical axis BL, so that if the light going out from discharge tube 7 and reflecting on total reflection faces 12a and 12b must travel generally in parallel with optical axis BL, total reflection faces 12a and 12b need a greater curvature. On top of that, the curve of total reflection faces 12a and 12b around the starting point SP must be set such that the space between total reflection face 12a and total reflection face 12b falls within a radiation angle. As a result, strobe device 1 of the first comparison sample needs total reflection faces 12a and 12b having a greater curvature than that of strobe device 1 in accordance with the second embodiment, and end points EP of total reflection faces 12a and 12b of this comparison sample are located farther forward. Although margin 14 reserved for mounting strobe device 1 of the first comparison sample to an imaging device is omitted from this strobe device 1, i.e. beam-emitting face 13 extends between end points EP of total reflection faces 12a and 12b, optical member 8 as a whole becomes bulky.

In strobe device 1 of the third comparison sample, complementary beam BS enters total reflection faces 12a and 12b at an excessively wide incident angle, so that complementary beam BS reflects to the outside of optical member 8. Complementary beam BS reflected at around starting point SP of total reflection faces 12a and 12b thus reflects again on total reflection faces 12a and 12b at end point EP side. Although complementary beam BS resultantly falls on the irradiation range, its light volume decreases due to multiple reflections on total reflection faces 12a and 12b. In strobe device 1 of the third comparison sample, since reflections are repeated between starting points SP and end points EP on total reflection faces 12a and 12b, the light volume of complementary beams BS decreases.

In strobe device 1 of the first comparison sample, the repeated reflections on total reflection faces 12a and 12b make many of complementary beams BS hard to enter the light path through which main beam BM travels, and complementary beams BS reflected at the vicinity of end point EP of total reflection faces 12a and 12b are radiated toward the center side, i.e. toward optical axis BL. As a result, although complementary beams BS reflected at the vicinity of end point EP gather at the center of the irradiation range, many other complementary beams BS fall outside the irradiation range.

Figure 7B:
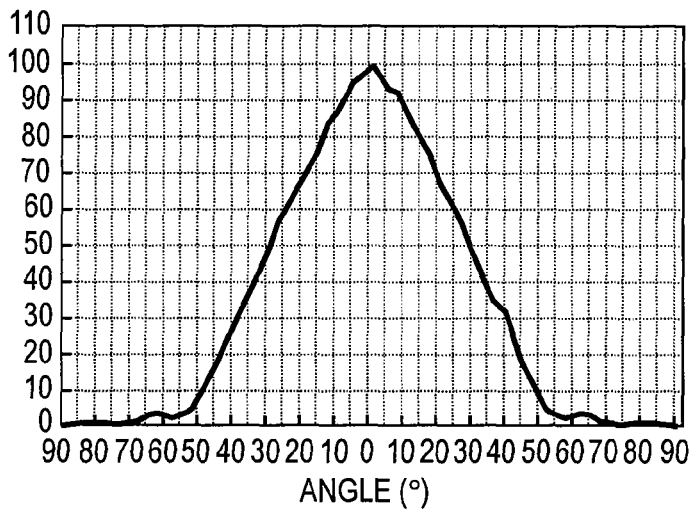
FIG. 7B is a graph of a light distribution of a light emitting section of the third comparison sample for illustrating a difference in light distribution between this section and the light emitting section in accordance with the second embodiment of the present invention.

As shown in FIG. 7B, in strobe device 1 of the third comparison sample, only the center part of the irradiation range, on which main beam BM falls, receives a greater light volume, because complementary beams BS reflected around end point EP of total reflection faces 12a and 12b gather at this center part. It is thus acknowledged that strobe device 1 of the third comparison sample cannot distribute the light uniformly.

As shown in FIG. 6C, in strobe device 1 of the fourth comparison sample, each of total reflection faces 12a and 12b is formed such that the two tangential lines extending from starting point SP located on discharge tube 7 side cross each other behind the outer peripheral face of glass bulb 4. The tangential lines have a narrow angle with respect to optical axis BL, so that total reflection faces 12a and 12b rise at the vicinity of starting points SP. As a result, in strobe device 1 of the fourth comparison sample, the space between the pair of total reflection faces 12a and 12b becomes so narrow that complementary beam BS outgoing from discharge tube 7 enters total reflection faces 12a and 12b at an narrower incident angle than necessary.

In strobe device 1 of the fourth comparison sample, although complementary beams BS, reflected on total reflection faces 12a and 12b, travel through the light path of main beam BM, they incline largely toward optical axis BL. As a result, strobe device 1 of the fourth comparison sample has a smaller amount of light reflected generally in parallel with optical axis BL than that of strobe device 1 in accordance with the second embodiment, and complementary beam BS going out from beam-emitting face 13 crosses optical axis BL (i.e. at a place nearer to beam-emitting face 13) before it reaches the object.

Figure 7C:
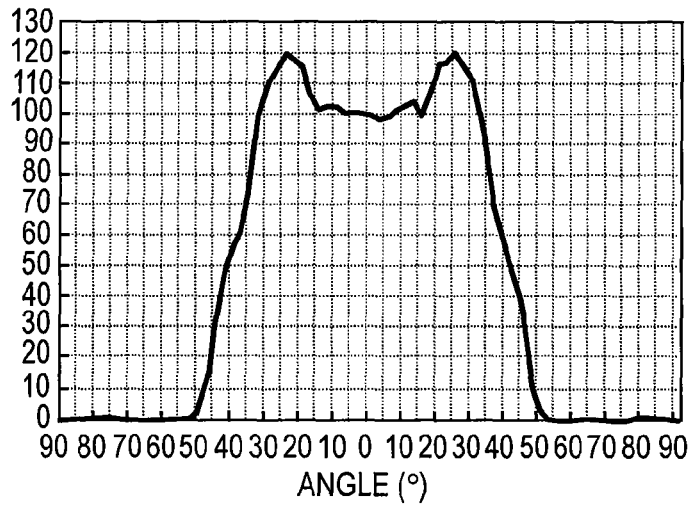
FIG. 7C is a graph of a light distribution of a light emitting section of the fourth comparison sample for illustrating a difference in light distribution between this section and the light emitting section in accordance with the second embodiment of the present invention.

In strobe device 1 of the fourth comparison sample, complementary beams BS thus gather on periphery of the center part of the irradiation range on which main beam BM falls, and as shown in FIG. 7C, the center part of the irradiation range receives a smaller light volume. It is thus acknowledged that this strobe device 1 cannot distribute the light uniformly.

Strobe device 1 in accordance with the second embodiment is proved that it performs more excellently than strobe devices 1 of the third and the fourth comparison samples. To be more specific, strobe device 1 of the present invention can perform excellently even it radiates to an irradiation range of a wider angle.

Figure 8:
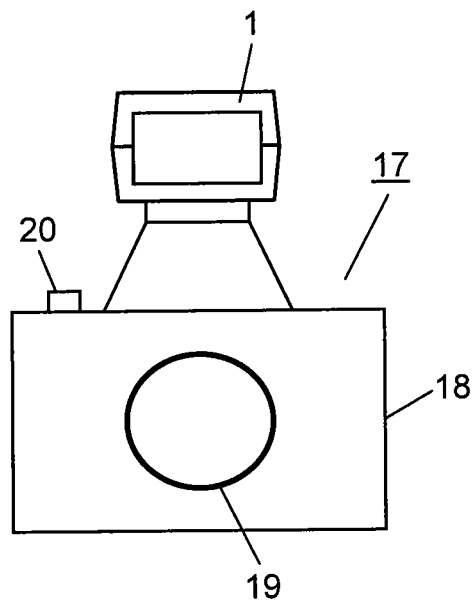
FIG. 8 is a front view of an imaging device in accordance with another embodiment of the present invention, this imaging device being equipped with the strobe device in accordance with an embodiment of the present invention.

Imaging device 17 equipped with strobe device 1 of the present is demonstrated briefly hereinafter. FIG. 8 is a front view of a digital camera as an embodiment of imaging device 17, which comprises the following structural elements:

imaging device main body 18;
imaging lens 19;
shooting start button 20; and
strobe device 1 integrated into imaging device main body 18.

A press onto shooting start button 20 disposed to imaging device main body 18 prompts strobe device 1 to radiate flashlight in a given volume toward an object (not shown), and at the same time, an image of the object is shot through imaging lens 19 onto an imaging element with an appropriate brightness. Imaging device 17 of the present invention equipped with strobe device 1 in accordance with the foregoing embodiments allows irradiating a desirable range with flashlight efficiently, thereby shooting a quality picture of the object.

Figure 9:
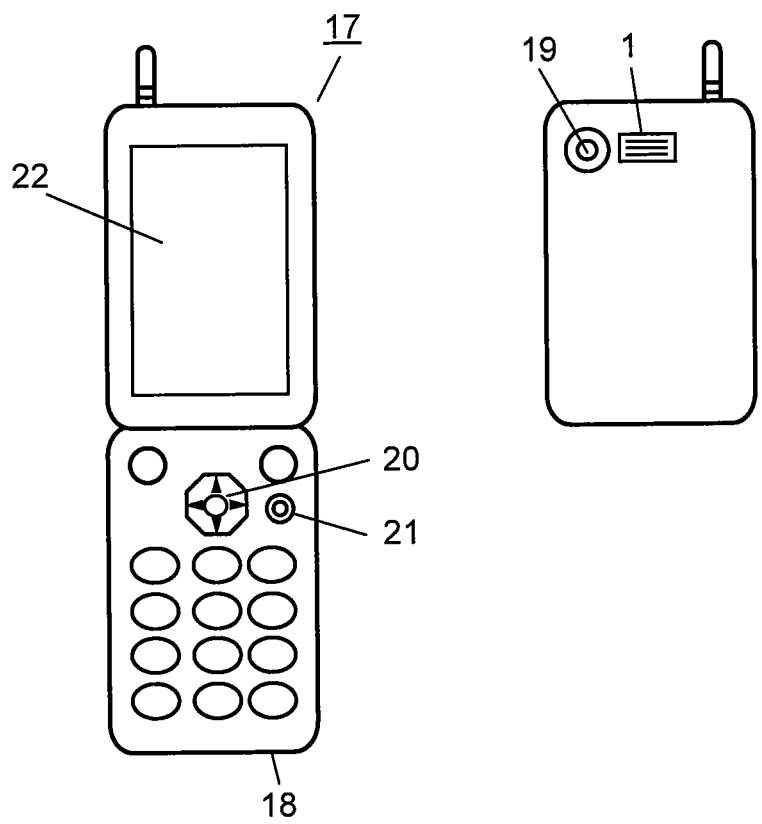
FIG. 9 shows an appearance of an imaging device in accordance with still another embodiment of the present invention, this imaging device being equipped with the strobe device in accordance with an embodiment of the present invention.

FIG. 9 shows an appearance of a portable telephone equipped with a camera as another embodiment of imaging device 17. Imaging device 17 further includes camera button 21 for switching a function of the telephone to a function of the camera, and LCD display 22 formed of an LCD for displaying a desired object for confirmation. Imaging lens 19 and strobe device 1 are disposed behind LCD display 22. Shooting start button 20 also allows selecting and determining a desirable function from a variety of menu, and a depress of shooting start button 20 starts shooting. The strobe device of the present invention can be thus easily downsized, so that it can be integrated into a mobile device, e.g. a portable phone with a built-in camera.

The strobe device and the imaging device of the present invention are not limited to the examples discussed previously, and they can be changed as far as the change does not deviate from the gist of the present invention.

Strobe device 1 is demonstrated hereinbefore on the assumption that it is integrated into an imaging device; however, strobe device 1 is not limited to these examples. For instance, strobe device 1 can be formed independent of an imaging device, and is mounted thereto when necessary. In the foregoing embodiment, the digital camera, analog camera, and camcorder are taken as examples; however, the portable phone with a built-in camera can be a subject.

In the previous embodiments, Fresnel groove is provided to beam-emitting face 13 of optical member 8; however, the structure is not limited to this. For instance, beam-emitting face 13 can be flat or have Fresnel groove depending on the performance of strobe device 1.

In the previous embodiments, beam-emitting face 13 of optical member 8 is disposed in front of end points EP of total reflection faces 12a and 12b; however the structure is not limited to this, for instance, in a case where optical member 8 can be maintained in front of discharge tube 7, it is not necessarily to prepare margin 14, so that beam-emitting face 13 can be disposed between end point EP of total reflection face 12a and another end point EP of total reflection face 12b.

In the embodiments previously discussed, total reflection faces 12a and 12b are formed such that complementary beam BS reflected on a point near end point EP of either one of total reflection face 12a or 12b can travel in parallel with or generally in parallel with main beam BM passing near the edge of first incident face 10 located on the counterpart total reflection face 12a or 12b. However, the structure is not limited to this, for instance, total reflection faces 12a and 12b can be formed such that complementary beam BS reflected on points near to end points EP of total reflection faces 12a and 12b can travel in parallel with or generally in parallel with optical axis BL of strobe device 1. Not to mentions, however, a better light emitting performance can be achieved by the structure discussed in the previous embodiments.

In the embodiments discussed previously, optical member 8 is made of acrylic resin; however the structure is not limited to this one. It can be made of another resin through which light can transmit, or glass.

INDUSTRIAL APPLICABILITY

The strobe device and the imaging device of the present invention can advantageously irradiate an irradiation range efficiently with light radiated from a discharge tube. The strobe device includes the discharge tube having reflective film formed on an outer peripheral face of a glass bulb and an optical member disposed in front of the discharge tube. The image device equipped with the strobe device is thus useful.

REFERENCE MARKS IN THE DRAWINGS 1 strobe device
2 light emitting section
3 holder
4 glass bulb
5 reflective film
6 light transparent section
7 discharge tube
8 optical member
9a, 9b electrode terminal
10 first incident face
11a, 11b second incident face
12a, 12b total reflection face
13 beam-emitting face
14 margin
15 connecting metal bracket
16 substrate
17 imaging device
18 imaging device main body
19 imaging lens
20 shooting start button
21 camera button
22 LCD display
BL optical axis
BM main beam
BS complementary beam
C center axis (center)
SP starting point
EP end point
P intersection point
TLa, TLb tangential line

The invention claimed is:

1. A strobe device comprising:
a discharge tube including:
    a cylindrical glass bulb;
    a reflective film formed on an outer peripheral face of the glass bulb; and
    a light transparent section shaped in an area, where no reflective film is formed on the front side of the outer peripheral face; and
an optical member disposed in front of the light transparent section,
wherein the optical member includes:
a first incident face confronting the light transparent section in front of the light transparent section for receiving a main beam radiated forward from the light transparent section;
a pair of second incident faces extending from the discharge tube toward the first incident face with a space provided therebetween in a direction orthogonal to a center axis of the discharge tube for receiving a complementary beam radiated obliquely-forward from the light transparent section of the discharge tube;
a pair of total reflection faces extending forward on the outside of the second incident faces with a space provided therebetween in the direction orthogonal to the center axis of the discharge tube for reflecting totally and forwardly the complementary beam coming from the second incident faces; and
an beam-emitting face formed in front of the first incident face for projecting the main beam and the complementary beam outward,
wherein each of the pair of total reflection faces is formed of a curved face such that the space between the curved faces expands toward the front side from the discharge tube side, and two tangential lines to the curved faces at starting points located on the discharge tube side cross each other at an intersection point behind the center of the discharge tube and yet in front of the outer peripheral face of the glass tube.

2. The strobe device of claim 1, wherein each of the total reflection faces is formed such that the complementary beam reflected on an end point side of one of the total reflection faces travels in parallel or generally in parallel with the main beam passing through the first incident face in the vicinity an outer edge thereof located at the side of the other total reflection face.

3. An imaging device equipped with the strobe device as defined in claim 1.

4. An imaging device equipped with the strobe device as defined in claim 2.

* * * * *